L. B. HAMILTON.
RASP.
APPLICATION FILED MAR. 20, 1911.
1,032,897.
Patented July 16, 1912.
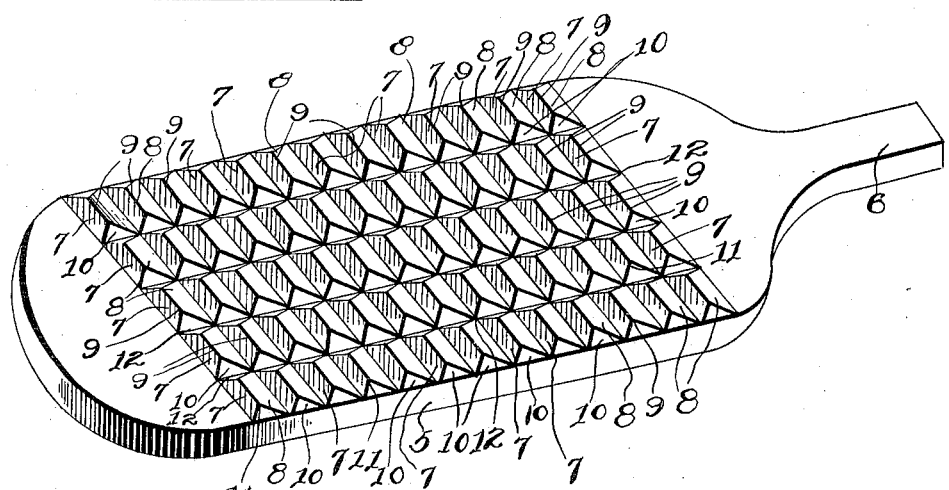
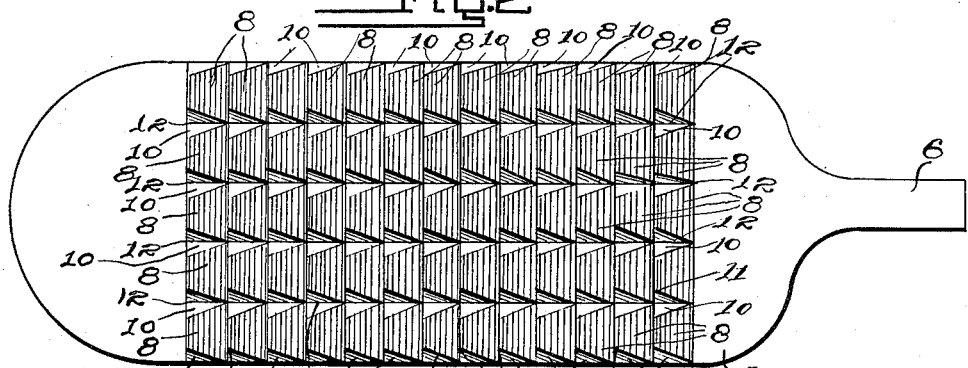
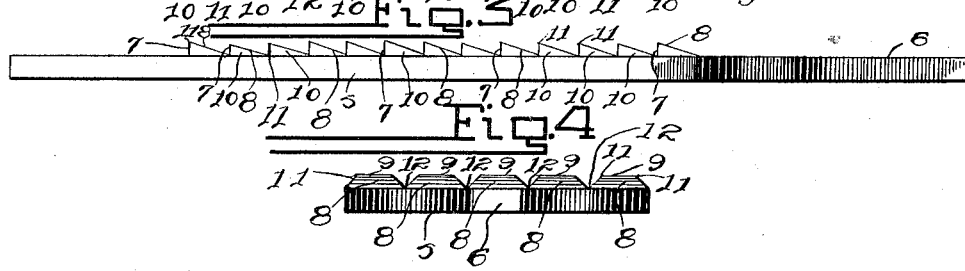
WITNESSES
Howard F. Costello.
H. Joseph Doyle.
INVENTOR
Loyd B. Hamilton
By E. E. Trooman,
his Attorney.

UNITED STATES PATENT OFFICE.

LOYD B. HAMILTON, OF CENTERVILLE, IOWA.

RASP.

1,032,897.　　　　Specification of Letters Patent.　　Patented July 16, 1912.

Application filed March 20, 1911. Serial No. 615,616.

*To all whom it may concern:*

Be it known that I, LOYD B. HAMILTON, a citizen of the United States, residing at Centerville, in the county of Appanoose and State of Iowa, have invented certain new and useful Improvements in Rasps, of which the following is a specification, reference being had therein to the accompanying drawing.

This invention relates to rasps, files and similar tools, and the principal object of the same is to provide a flat tool having one surface provided with a plurality of teeth which are arranged so that they can be sharpened when necessary and are of such shape that they present elongated cutting edges so that the tool may be used for a long period without requiring sharpening.

A preferred and practical embodiment of the invention is shown in the accompanying drawing, wherein:—

Figure 1 is a perspective view of the improved tool, shown as a rasp. Fig. 2 is a top plan view. Fig. 3 is a view in elevation of one longitudinal edge thereof. Fig. 4 is an end view.

Referring to the accompanying drawings by numerals, it will be seen that the improved tool comprises a flat body 5 having a reduced and preferably integral shank 6 projecting from one end thereof.

Body 5 has a part of one surface provided with a plurality of teeth which are preferably regularly spaced and arranged in longitudinal rows. Said teeth have straight vertical front walls 7, flat inclined upper surfaces 8 that provide the elongated cutting edges 9 at the junction of the front walls 7 and upper surfaces 8, and the beveled ends 10 that cause the surfaces 8 to taper in width and provide the sharp points 11. The front part 15 of the body 5 is rounded and not provided with teeth, being used as a hand hold.

The inclined surfaces 8 of the teeth provide grooves that extend transversely across the body 5 so that said teeth can be readily sharpened by means of a file or other sharpening tool. The beveled ends 10 of adjacent teeth provide between them substantially triangular recesses 12 in which shavings and dust collect, and which can be readily removed therefrom by blowing on the tool or shaking the same.

It will be seen that the teeth of the improved tool have a chisel-shape so that they present a comparatively large cutting edge to the work. It will also be understood that the tool can be used in connection with horseshoeing, woodworking, and other work requiring the use of a rasp or file.

The shank 6 is shaped to facilitate its engagement with a handle, but it will be clear that a handle is not essential for the said shank can be used as a handle if desired.

What I claim as my invention is:—

A rasp comprising a body with a shank, and a hand hold at its front end, said body having a plurality of teeth on a relatively large portion of one surface of the body, said teeth having straight, vertical, front walls and inclined flat tapering surfaces, the junction of said walls and the flat surfaces forming elongated cutting edges, the ends of said teeth being beveled, said teeth being relatively arranged so that their inclined flat surfaces produce a plurality of transverse grooves, and the beveled ends of said teeth forming a plurality of triangularly-shaped recesses.

In testimony whereof I hereunto affix my signature in presence of two witnesses.

LOYD B. HAMILTON.

Witnesses:
　GEO. PAYTON,
　LEE COOKSEY.